No. 717,515. Patented Dec. 30, 1902.
J. S. STONE.
METHOD OF ELECTRICAL DISTRIBUTION.
(Application filed Nov. 17, 1902.)
(No Model.)
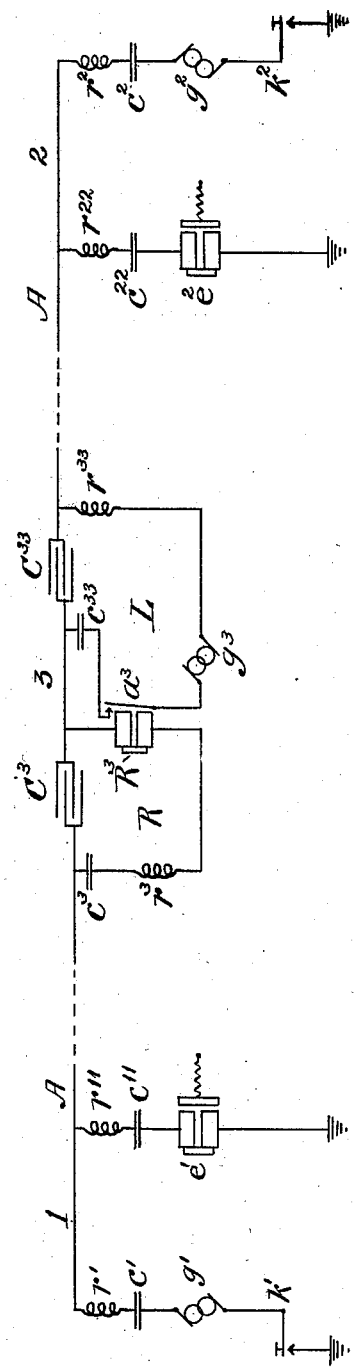
WITNESSES
INVENTOR

UNITED STATES PATENT OFFICE.

JOHN STONE STONE, OF CAMBRIDGE, MASSACHUSETTS.

METHOD OF ELECTRICAL DISTRIBUTION.

SPECIFICATION forming part of Letters Patent No. 717,515, dated December 30, 1902.

Original application filed August 4, 1902, Serial No. 118,210. Divided and this application filed November 17, 1902. Serial No. 131,644. (No model.)

*To all whom it may concern:*

Be it known that I, JOHN STONE STONE, of Cambridge, in the county of Middlesex and State of Massachusetts, have invented a new and useful Method of Electrical Distribution, of which the following is a specification.

My improvement relates especially to a method of electrical distribution in which vibrating currents are employed and it is desirable to use automatic relays in the circuit.

In a companion application hereto, Serial No. 118,210, of which application this is a division, I have set forth at length the difficulties which arise in the use of such a method when a transmitting-generator develops currents of the same frequency as the relay-generator, and I have therein described and claimed, broadly, my new method of electrical distribution by means of which the difficulties referred to therein have been overcome, showing also various means by which the said method may be carried into effect. In the said application I have also claimed a specific method of distribution in which the energy of the current is directed from the main line into the local resonant circuit containing the relay by means of an inductance-coil.

My present invention consists in another method of distribution wherein the energy of the current is directed from the main line to the local relay-circuit by a condenser of a larger capacity than the condenser of the relay-circuit.

My present invention will be understood when described in connection with the drawing, in which the figure shows diagrammatically the connections and apparatus by means of which my method may be carried out.

The drawing shows a two-station circuit, though it will be evident to those skilled in the art, especially after comprehending the broad scope of my invention contained in the above-mentioned application, that the method may also be utilized with more than two stations, a relay-station being supplied for each pair of transmitting-stations. The stations shown in the drawing are marked 1 and 2, 3 being the relay-station. The stations 1 and 2 each consist of a transmitting apparatus and a receiving apparatus. The parts forming the transmitting apparatus at station 1, as shown, comprise a key $k'$, one terminal of which is grounded, the other being connected with means for impressing a vibrating current on the line, such as an alternating generator $g'$. This alternating generator is also connected with a condenser $c'$, which is connected with the main line A by means of an inductance-coil $r'$. The receiving apparatus at station 1 comprises, as shown, an electromagnet $e'$, one terminal of which is grounded, the other terminal being connected with a condenser $c^{11}$, which is connected with the main line A through an inductance-coil $r^{11}$. The station 2 comprises similar instruments, the transmitting instruments being indicated, respectively, by the letters $k^2$, $g^2$, $c^2$, and $r^2$ and the receiving instruments by the letters $e^2$ $c^{22}$ $r^{22}$.

The relay-station 3, as shown, comprises a condenser $C^3$ in the main line A, having a relay-circuit R looped about it, the loop containing a relay $R^3$, an inductance-coil $r^3$, and a condenser $c^3$ of less capacity than the condenser $C^3$. The local circuit L of the relay in this case is also a loop comprising an armature $a^3$ in the field of the relay $R^3$, means for developing a vibrating current $g^3$, an inductance-coil $r^{33}$, located, as shown, between the generator $g^3$ and the main line A, and a condenser $c^{33}$, located between the terminal of the armature and the main line A, a condenser $C^{33}$, of large capacity compared with the capacity of the condenser $c^{33}$, being located between the two connections of the loop of the local relay-circuit L with the main line A.

When my method is carried out by means of such apparatus as is shown in the drawing, the generators $g'$ $g^2$ are such as are capable of developing currents of the same frequency; but each is effective to operate the armature $a^3$ of the relay local circuit L and not the receiving instruments $e'$ $e^2$. The generator $g^3$ at the relay-station develops currents of a frequency different from the generators $g'$ $g^2$ and is capable of affecting the receiving instruments $e'$ $e^2$, though neither of them can affect the relay-armature $a^3$. Thus a signal sent from station 1 through the impression upon the line of a vibrating current caused by the generator $g'$ of that section will be effective to operate the armature $a^3$ at the relay-station, but cannot of itself affect the receiving instrument $e^2$ at station 2, as that instrument is not resonant to the frequency of the generator $g'$. The closing of the armature $a^3$, however, causes the effective operation of the generator $g^3$, which, developing a current to the frequency to which the circuit containing the receiver $e^2$ is attuned, causes the receiver $e^2$ to receive the signal without, however, in any way affecting the continued and intelligent operation of the armature $a^3$ at the relay-station. In this arrangement the condensers $C^3$ $C^{33}$ serve to direct the energy of the current into the local resonant circuit containing the relay, and in order that they may do this effectively their capacity should be greater than the capacity of the condensers $c^3 c^{33}$, which are in the two loop-circuits at the relay-station.

What I claim as my invention is—

1. The method of absorbing the energy of currents of one frequency traversing a main line to the exclusion of the energy of currents of other frequencies traversing said main line, which consists in diverting the energy of the current of said frequency by means of a condenser included in said main line into a local resonant circuit associated with said main line and containing a tuning-condenser of capacity very small compared to that of the said condenser included in the main line.

2. The method of absorbing the energy of currents of one frequency traversing a main line to the exclusion of the energy of currents of other frequencies traversing said main line, which consists in diverting the energy of the current of said frequency by means of a condenser included in said main line into a local resonant circuit associated with said main line and containing a tuning-condenser of capacity so small that its reactance shall swamp the effect of the reactance, in said loop-circuit, of said condenser in the main line.

In testimony whereof I hereunto set my name this 13th day of November, 1902.

JOHN STONE STONE.

Witnesses:
GEORGE O. G. COALE,
M. E. FLAHERTY.